United States Patent
Yamamoto et al.

(10) Patent No.: US 11,427,139 B2
(45) Date of Patent: Aug. 30, 2022

(54) ROUTING STRUCTURE OF ELECTRIC WIRES

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Housei Mizuno, Mie (JP); Makoto Higashikozono, Mie (JP); Kaho Hayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 256 days.

(21) Appl. No.: 16/755,978

(22) PCT Filed: Jun. 29, 2018

(86) PCT No.: PCT/JP2018/024793
§ 371 (c)(1),
(2) Date: Apr. 14, 2020

(87) PCT Pub. No.: WO2019/082446
PCT Pub. Date: May 2, 2019

(65) Prior Publication Data
US 2020/0307475 A1  Oct. 1, 2020

(30) Foreign Application Priority Data

Oct. 26, 2017  (JP) .............................. JP2017-206903

(51) Int. Cl.
*B60R 16/03* (2006.01)
*B60R 16/02* (2006.01)
(Continued)

(52) U.S. Cl.
CPC ........ *B60R 16/0215* (2013.01); *B60R 16/027* (2013.01); *B60R 16/03* (2013.01);
(Continued)

(58) Field of Classification Search
CPC .............................. B60N 2/5678; B60N 2/02; B60N 2002/0236; B60N 2002/0264;
(Continued)

(56) References Cited

U.S. PATENT DOCUMENTS 6,179,378 B1 * 1/2001 Baumgartner ......... B60N 2/002
297/180.12
2003/0071738 A1  4/2003 Joly
(Continued)

FOREIGN PATENT DOCUMENTS

JP  H05-093300 U   12/1993
JP  H11-198743     7/1999
(Continued)

OTHER PUBLICATIONS

International Search Report issued in International Patent Application No. PCT/JP2018/024793, dated Aug. 7, 2018, along with an English translation thereof.

*Primary Examiner* — Levi Gannon
(74) *Attorney, Agent, or Firm* — Greenblum & Bernstein, P.L.C.

(57) ABSTRACT

A routing structure for routing an electric wire to a vehicle seat includes: a first cushion portion attached to the vehicle seat; and the electric wire fixed to the first cushion portion.

8 Claims, 21 Drawing Sheets

(51) Int. Cl.
*B60R 16/027* (2006.01)
*B60R 16/037* (2006.01)
*B60N 2/56* (2006.01)
*B60R 11/00* (2006.01)

(52) U.S. Cl.
CPC .......... B60R 16/037 (2013.01); *B60N 2/5678* (2013.01); *B60R 2011/0015* (2013.01)

(58) Field of Classification Search
CPC ..... B60R 2011/0012; B60R 2011/0015; B60R 16/0215; B60R 16/027; B60R 16/037; B60R 16/03
See application file for complete search history.

(56) References Cited

U.S. PATENT DOCUMENTS

| | | | |
|---|---|---|---|
| 2015/0274049 A1* | 10/2015 | Langensiepen | B60N 2/5628 297/180.12 |
| 2016/0129817 A1* | 5/2016 | Shimizu | B60H 1/2227 219/202 |
| 2017/0066355 A1* | 3/2017 | Kozlowski | B60N 2/70 |
| 2017/0096088 A1* | 4/2017 | Persson | B60N 2/5678 |
| 2018/0361895 A1* | 12/2018 | Hoshi | B60N 2/5816 |
| 2019/0047450 A1* | 2/2019 | Bhatia | B60N 2/36 |
| 2019/0061573 A1* | 2/2019 | Dry | B60N 2/5642 |

FOREIGN PATENT DOCUMENTS

| | | |
|---|---|---|
| JP | 2003-050282 | 2/2003 |
| JP | 2006-082759 | 3/2006 |
| JP | 2009-072446 | 4/2009 |
| JP | 2010-089640 | 4/2010 |
| JP | 2015-048039 | 3/2015 |
| JP | 2015-076919 A | 4/2015 |

* cited by examiner

ROUTING STRUCTURE OF ELECTRIC WIRES

TECHNICAL FIELD

A technology disclosed in the present specification relates to a technology for routing electric wires in a vehicle seat.

BACKGROUND ART

Heretofore, a structure described in Patent Document 1 is known as a structure of routing electric wires in a seat for a vehicle such as an automobile. An electric device such as a heater and a side airbag is attached to the seat. Electric wires for supplying electric power for operating these electric devices are led out from a floor of the vehicle and are routed in a space between the seat and the floor. The electric wires are also routed inside the seat.

RELATED ART DOCUMENT

Patent Document

[Patent Document 1] Japanese Unexamined Patent Application Publication No. H11-198743

SUMMARY OF THE INVENTION

Problem to be Solved by the Invention

Recently, various functions of the seat have been improved. For example, a reclining mechanism and a sliding mechanism are driven by a motor disposed in the seat. For this reason, the number and types of electrical devices attached to the seat tend to increase. Since the number and types of electric wires connected to these electrical devices also increase, there is a problem that it is difficult to sufficiently ensure a routing space of the electric wires inside the seat. Moreover, as the number and types of electric wires increase, routing routes of the electric wires becomes complicated, and accordingly, there is a problem that man-hours for assembling the electric wires increase.

The technology disclosed in the present specification has been completed based on the above-described circumstances, and has an object to provide a routing structure of electric wires, which ensures a routing space of the electric wires, and reduces the man-hours for assembling the electric wires.

Means for Solving the Problem

The technology disclosed in the present specification is a routing structure of an electric wire, including: a cushion portion attached to a vehicle seat; and an electric wire fixed to the cushion portion.

According to the above configuration, the cushion portion to which the electric wire is fixed is attached to the vehicle seat, whereby the electric wire can be routed to the vehicle seat, and accordingly, the number of man-hours for attaching the electric wire to the vehicle seat can be reduced.

Further, since the electric wire is fixed to the cushion portion, a space in the seat, in which the cushion portion is disposed, is used effectively, whereby a space for routing the electric wire can be ensured.

As aspects of the technology disclosed in the present specification, the following aspects are preferable.

It is preferable that the electric wire be sewn to the cushion portion by a thread-like member.

According to the above configuration, since the electric wire is sewn to the cushion portion by the thread-like member, in comparison with a case of fixing the electric wire to the cushion portion using a relatively strong member such as a metal member, the electric wire can be routed without impairing flexibility of the cushion portion.

It is preferable that the electric wire be sewn to a sheet-like member by a thread-like member, and that the sheet-like member be fixed to the cushion portion.

According to the above configuration, since the electric wire is sewn to the sheet-like member, efficiency of a sewing operation of the electric wire can be improved.

It is preferable that the sheet-like member be fixed to the cushion portion by a tag pin.

According to the above configuration, efficiency of such an operation of fixing the sheet-like member to a bottom portion of the groove portion formed in the cushion portion can be improved.

It is preferable that the cushion portion have a groove portion, and that the electric wire be fixed to the cushion portion in a state of being disposed in the groove portion.

According to the above configuration, since the electric wire is disposed in the groove portion formed in the cushion portion, the electric wire is suppressed from protruding to the outside of the cushion portion. Thus, a routing space of the electric wire can be suppressed from enlarging.

It is preferable that the cushion portion have a groove portion, that the electric wire be disposed in the groove portion, and that the groove portion be joined in a state in which an opening portion of the groove portion is closed.

According to the above configuration, the electric wire can be fixed to the cushion portion by such a simple method of disposing the electric wire in the groove portion and closing the opening portion to join the groove portion.

It is preferable that the seat have a frame that supports the cushion portion, and that the groove portion be formed on a surface of the cushion portion, the surface contacting the frame, so as to be recessed in a direction of separating away from the cushion portion.

According to the above configuration, even if the passenger is seated on the seat, a weight of the passenger is applied to the cushion portion, and the weight is received by the frame, the electric wire is fixed to the bottom portion of the groove portion formed to be recessed in the direction of separating away from the frame, and accordingly, the electric wire is suppressed from receiving the force directly from the cushion portion. Thus, a malfunction that follows the application of the force to the electric wire is suppressed.

It is preferable that the seat include: a seating portion; and a backrest portion provided rotatably about a rotation shaft provided in the seating portion; that the cushion portion include: a first cushion portion disposed on the seating portion; and a second cushion portion disposed on the backrest portion; that the first cushion portion and the second cushion portion be coupled to each other by a flexibly sheet-like member, that the electric wire be sewn to the sheet-like member by a thread-like member, and that the sheet-like member includes an extra length portion that allows the backrest portion to rotate.

According to the above configuration, even when the backrest portion rotates about the rotation shaft provided in the seating portion, since the electric wire is sewn to the flexible sheet-like member, and the sheet-like member has the extra length portion, the sheet-like member can follow the rotation of the backrest portion. Thus, the malfunction that follows the application of the force to the electric wire is suppressed.

Advantageous Effects of Invention

According to the technology disclosed in the present specification, the routing space of the electric wires can be ensured and the man-hours for assembling the electric wires can be reduced.

MODES FOR CARRYING OUT THE INVENTION

Embodiment 1

Figure 1:
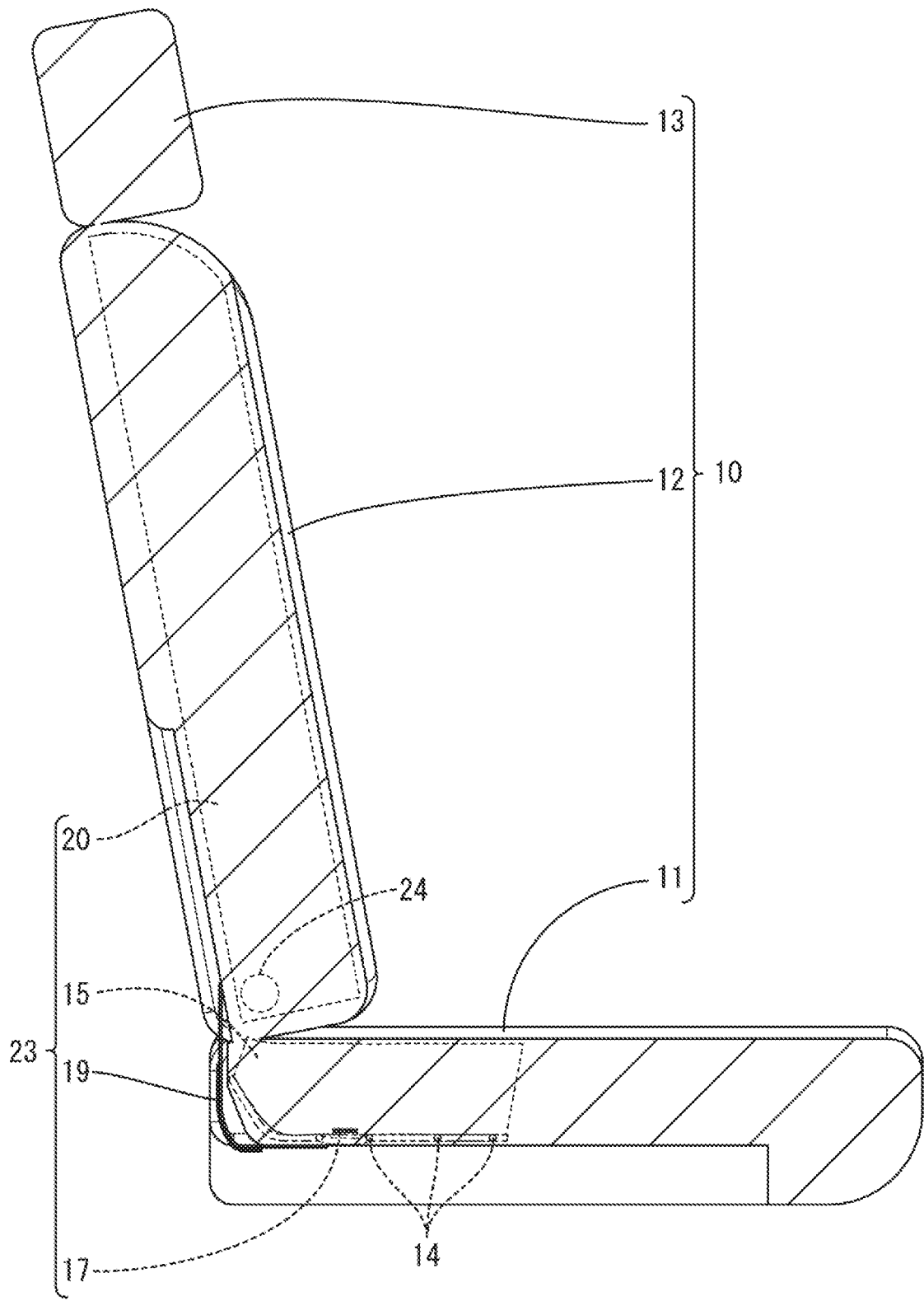
FIG. 1 is a cross-sectional view taken along a line I-I of FIG. 7, illustrating a vehicle seat according to Embodiment 1.

Referring to FIG. 1 to FIG. 14, a description will be given of Embodiment 1 in which a routing structure 23 of electric wires 17 according to a technology disclosed in the present specification is applied to a vehicle seat 10. A vehicle seat 10 mounted on a vehicle (not shown) includes a seating portion 11 and a backrest portion 12. The following description will be given on the assumption that a Z-direction is upward, that a Y-direction is forward, and that an X-direction is leftward. Moreover, regarding a plurality of the same members, in some cases, reference numerals are assigned to only some of the members, and reference numerals of other members are omitted.

As illustrated in FIG. 1, a backrest portion 12 is provided at a rear portion of the seating portion 11 via a reclining mechanism (not shown in detail). The backrest portion 12 is configured to rotate about a rotation shaft 24 provided in the reclining mechanism and extending in a left-right direction. A headrest 13 that protects a passenger's head and neck is provided on the backrest portion 12.

The seating portion 11 has a frame 14, and a first cushion portion 15 is attached to this frame 14. The first cushion portion 15 is made of, for example, polyurethane foam, and receives a weight of such a passenger when the passenger is seated on the seating portion 11.

Figure 2:
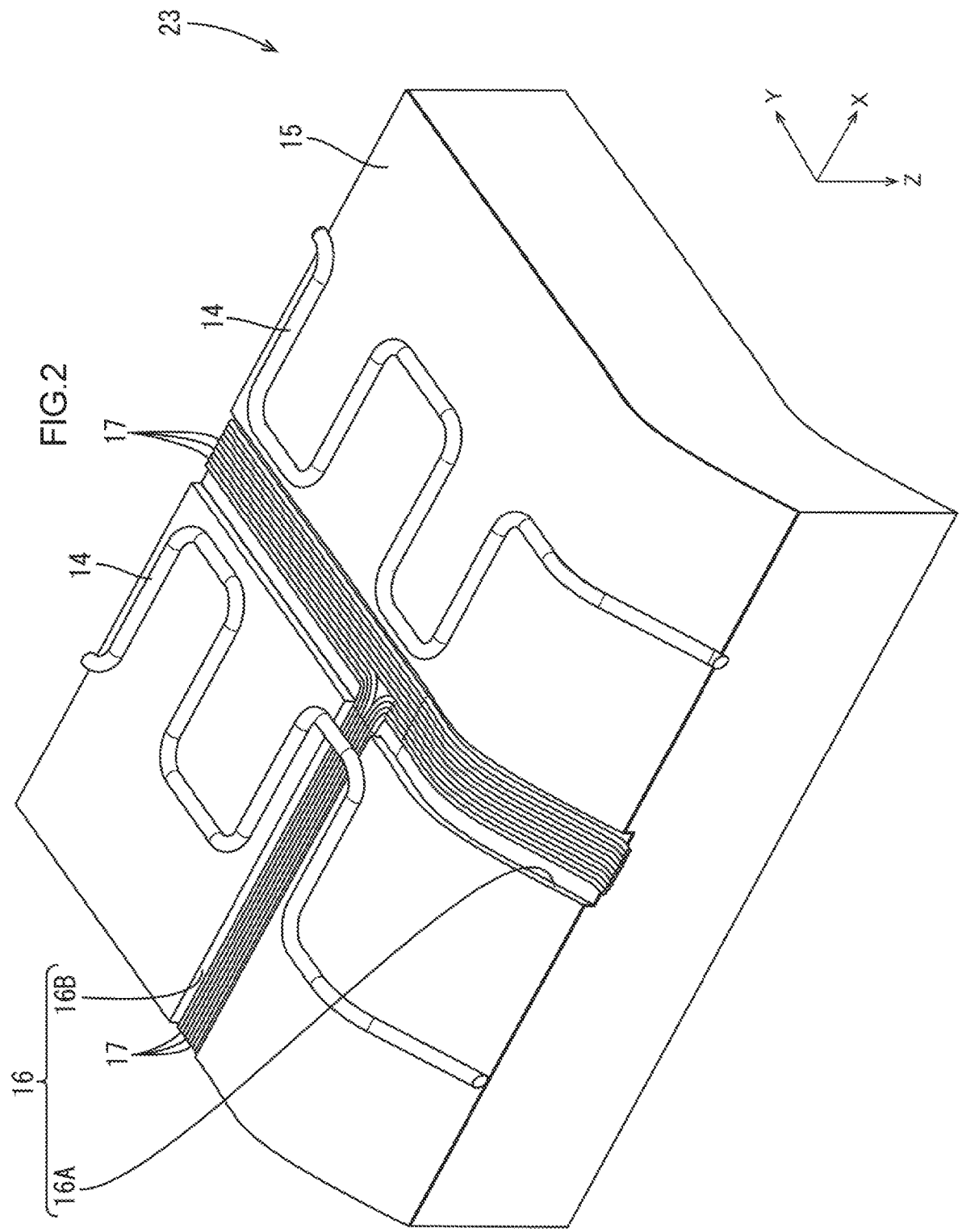
FIG. 2 is a partially enlarged perspective view illustrating a routing structure of electric wires.
Figure 3:
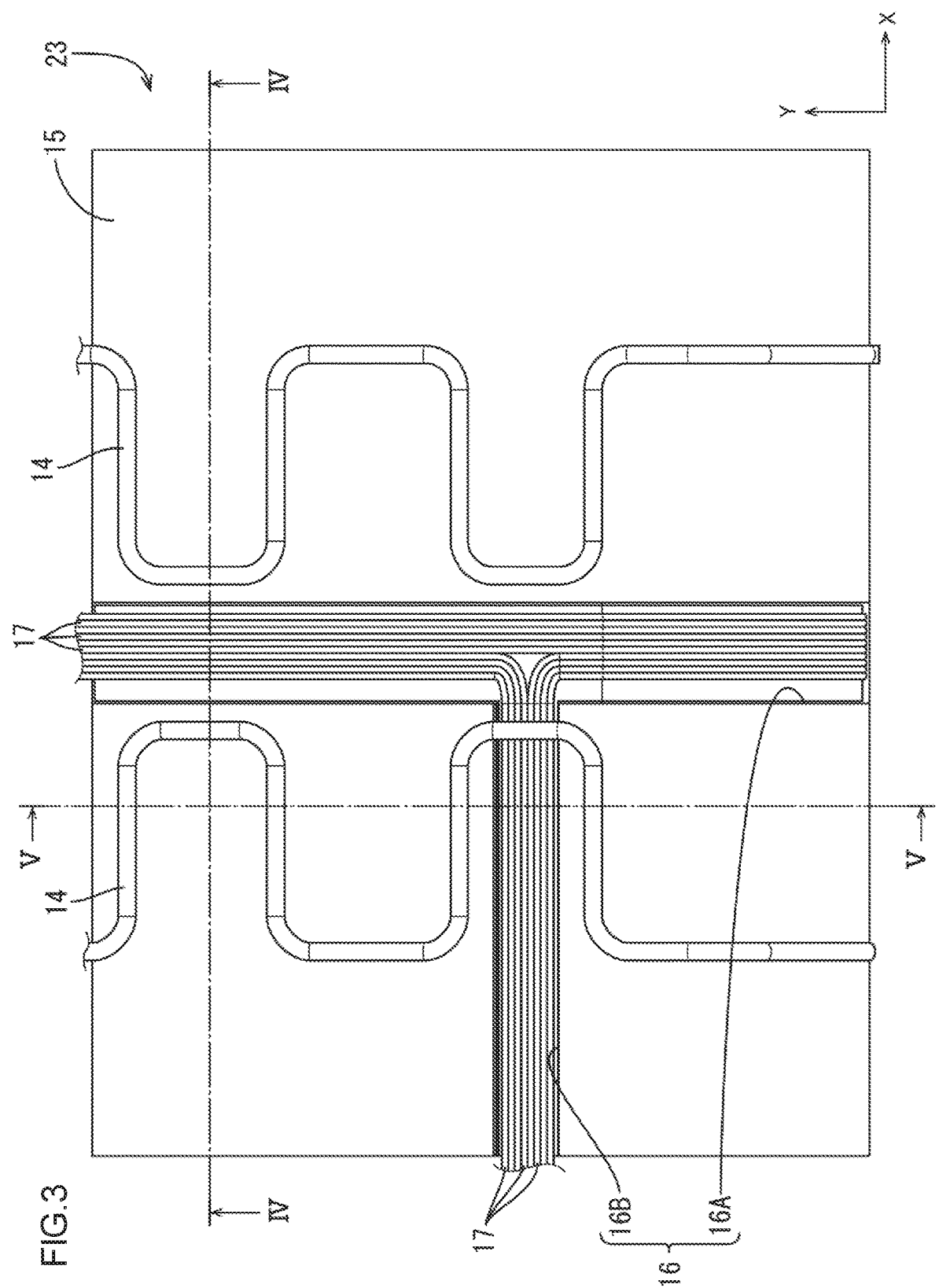
FIG. 3 is a partially enlarged plan view illustrating the routing structure of the electric wires.

As illustrated in FIGS. 2 and 3, the frame 14 is disposed below the first cushion portion 15, and supports a lower surface of the first cushion portion 15 from below. The frame 14 is formed by bending a metal bar material into a predetermined shape. The frame 14 extends in a front-rear direction while meandering.

Figure 4:
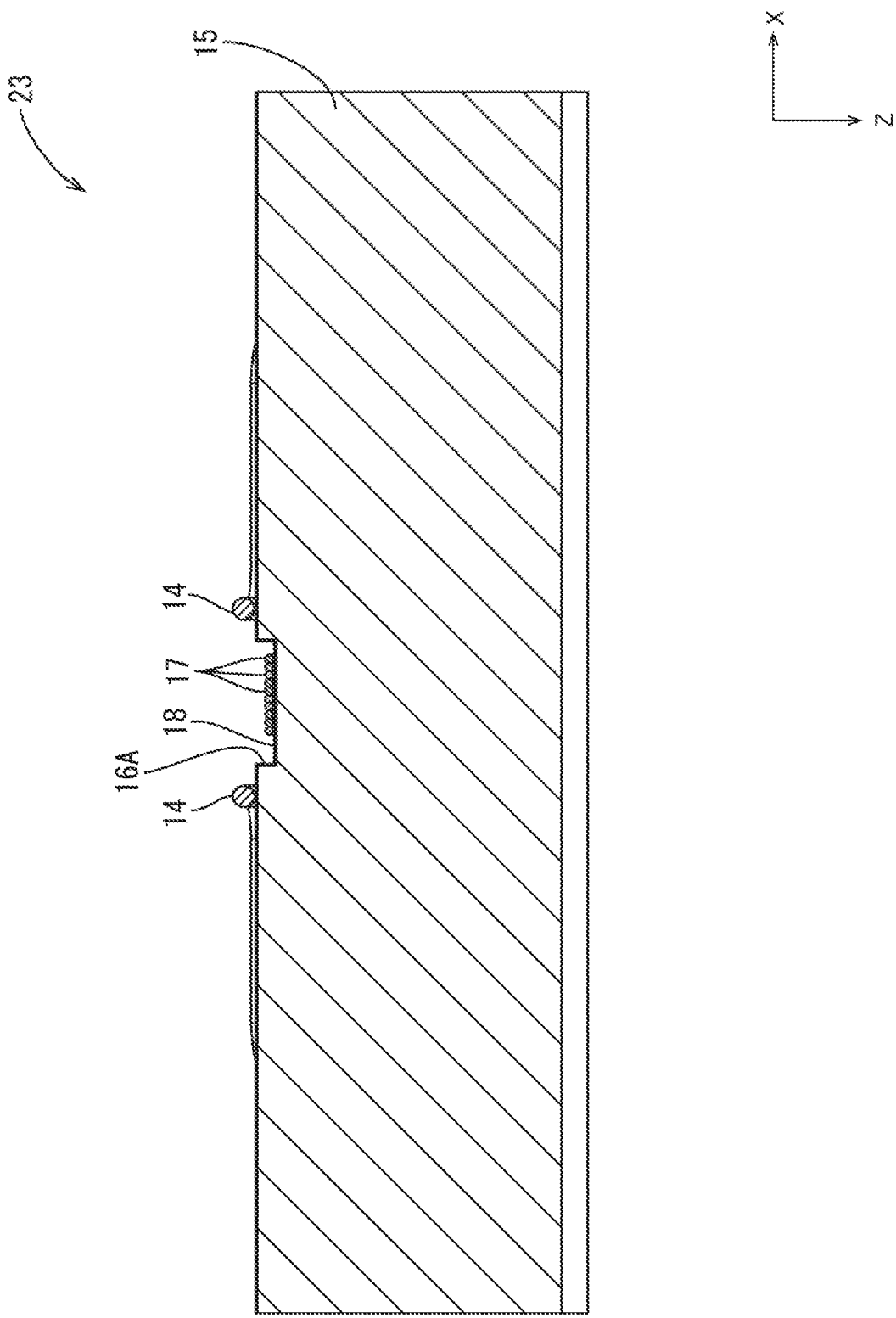
FIG. 4 is a cross-sectional view taken along a line IV-IV in FIG. 3.
Figure 5:
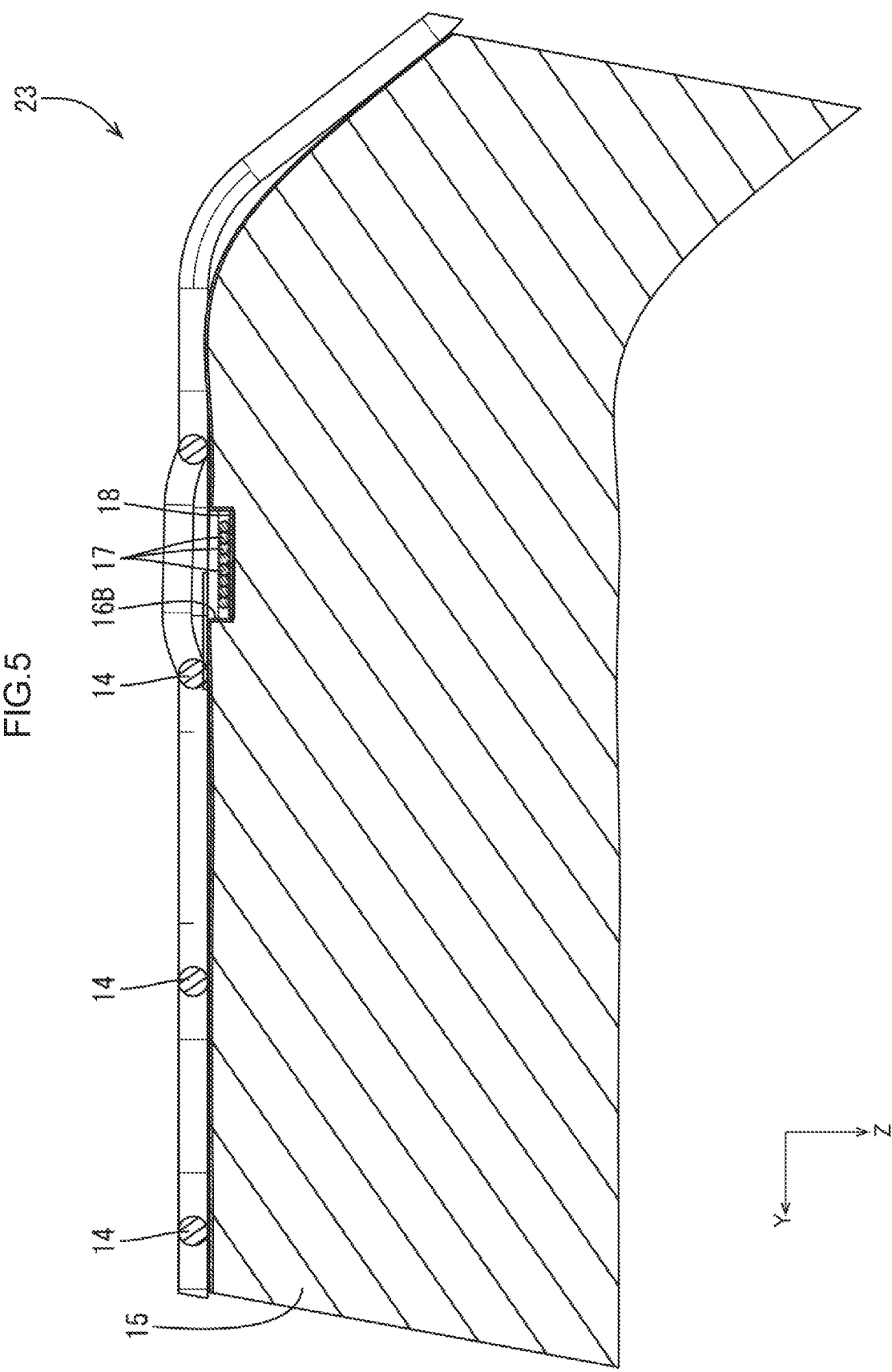
FIG. 5 is a cross-sectional view taken along a line V-V in FIG. 3.

As illustrated in FIGS. 3 to 5, a groove portion 16 is formed to be recessed on the lower surface of the first cushion portion 15. The groove portion 16 has: a main groove portion 16A extending in the front-rear direction; and a sub-groove portion 16B extending rightward from the main groove portion 16A. A plurality of electric wires 17 are routed inside the main groove portion 16A and the sub-groove portion 16B. A part of the electric wires 17, which is routed in the main groove portion 16A and extends in the front-rear direction is bent rightward and is routed in the sub-groove portion 16B. In the following description, when the main groove portion 16A and the sub-groove portion 16B are described without being distinguished from each other, the main groove portion 16A and the sub-groove portion 16B are referred to as a groove portion 16.

The main groove portion 16A is not provided in a region of the first cushion portion 15, where the frame 14 is disposed. The sub-groove portion 16B is provided to overlap an area of the first cushion portion 15, where the frame 14 is disposed. As illustrated in FIG. 5, the sub-groove portion 16B is formed to be recessed in a direction of separating away from the frame 14. A bottom wall 18 of the sub-groove portion 16B separates from the frame 14.

Figure 11:
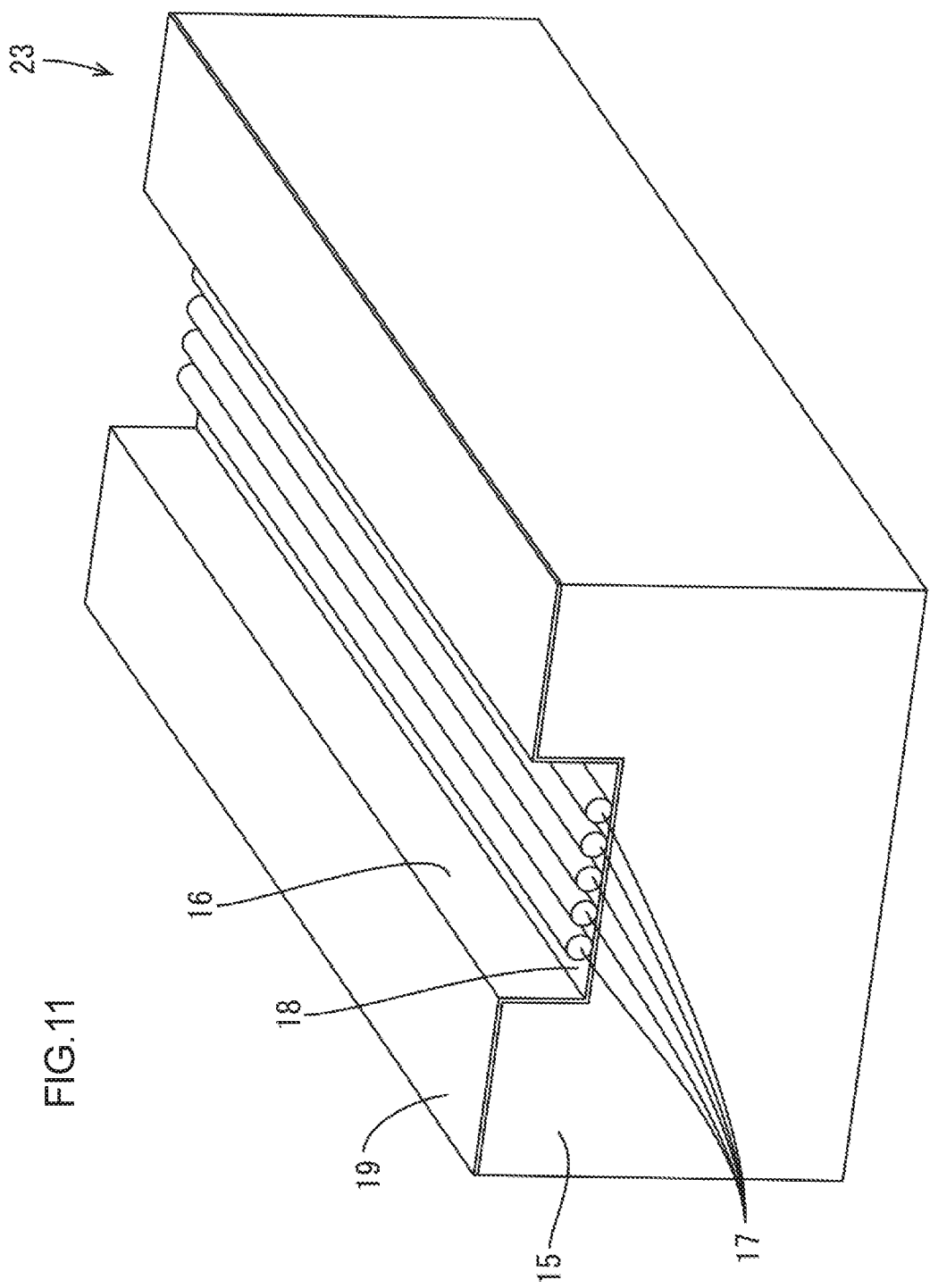
FIG. 11 is a partially enlarged perspective view illustrating an assembly step of the electric wires to a first cushion portion.

As illustrated in FIG. 11, a sheet-like member 19 is pasted to a surface (lower surface) of the first cushion portion 15 by a known method such as adhesion and heat fusion. The sheet-like member 19 is made of a woven fabric or a non-woven fabric, which is made of synthetic resin fiber. A form of the non-woven fabric may be a fiber sheet, a web (a thin film-like sheet composed only of fiber), or a bat (blanket-like fiber). The sheet-like member 19 is also attached to an inside of the main groove portion 16A and an inside of the sub-groove portion 16B.

The backrest portion 12 has a frame (not shown), and a second cushion portion 20 is attached to this frame. The second cushion portion 20 is made of, for example, polyurethane foam.

Figure 6:
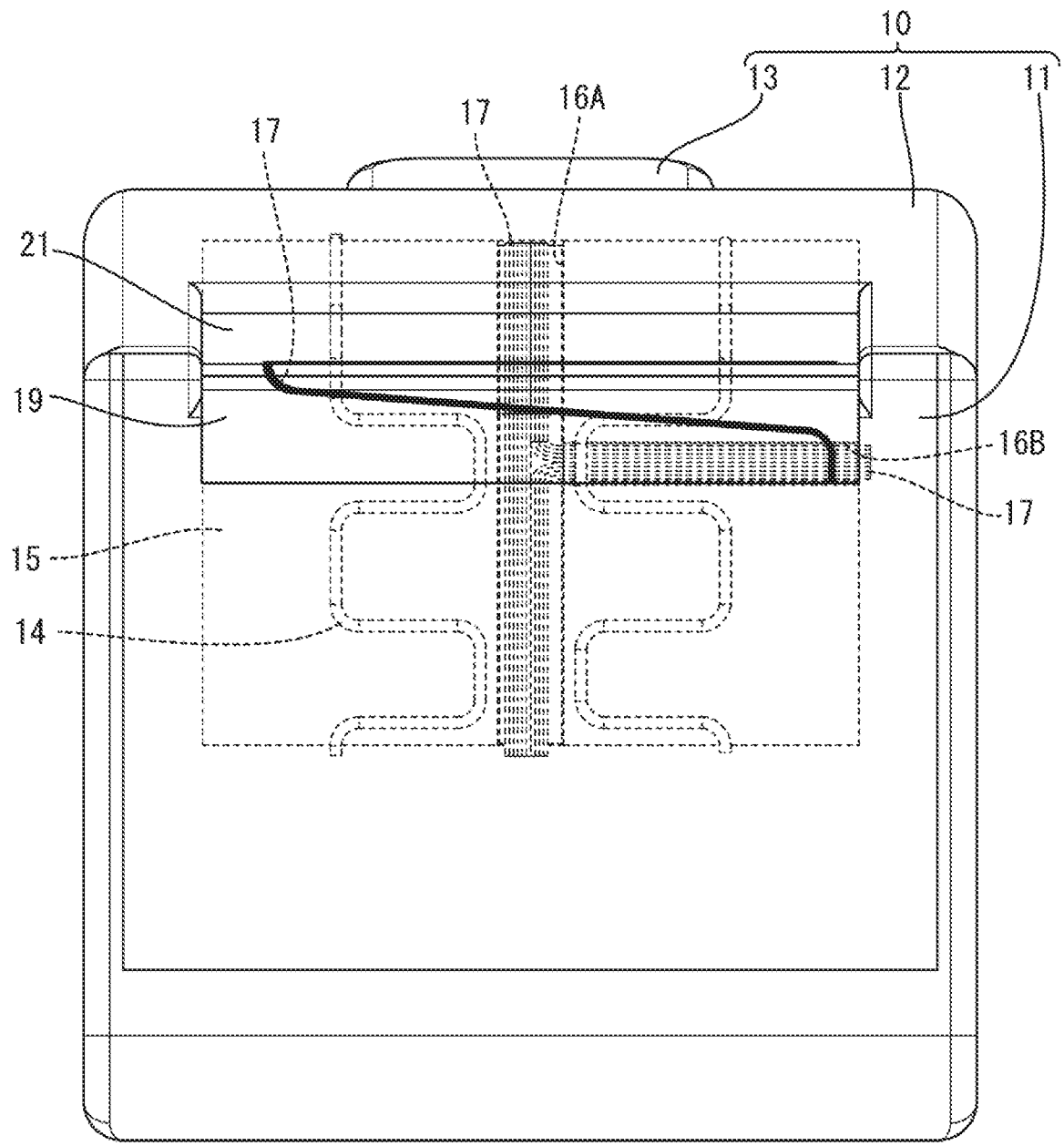
FIG. 6 is a bottom view illustrating the seat.
Figure 7:
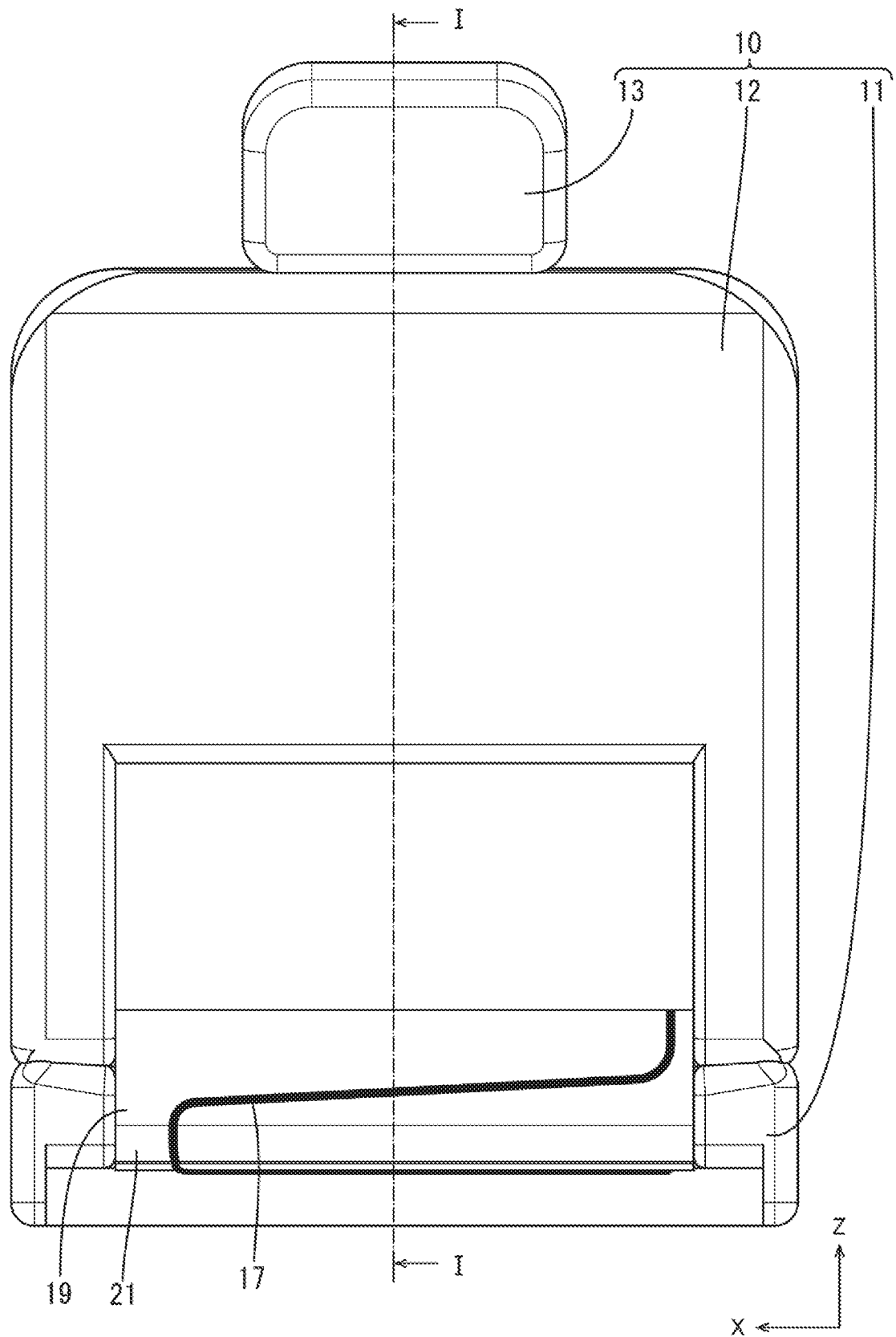
FIG. 7 is a rear view illustrating the seat.
Figure 8:
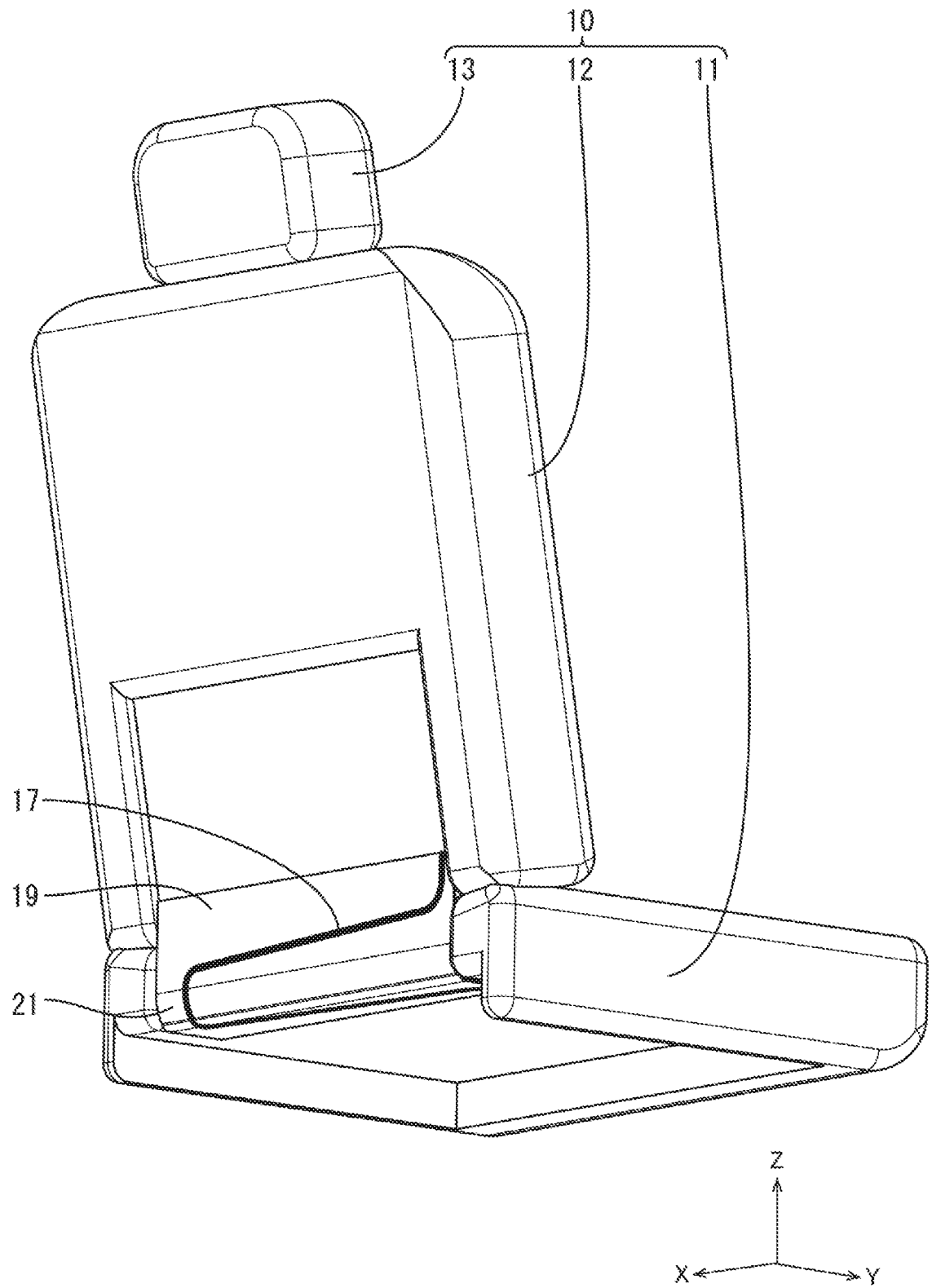
FIG. 8 is a perspective view illustrating the seat.

As illustrated in FIGS. 6 to 8, a sheet-like member 19 extending from a rear end portion of the first cushion portion 15 is pasted to a surface of the second cushion portion 20. In other words, the first cushion portion 15 and the second cushion portion 20 are coupled to each other by the sheet-like member 19.

Figure 9:
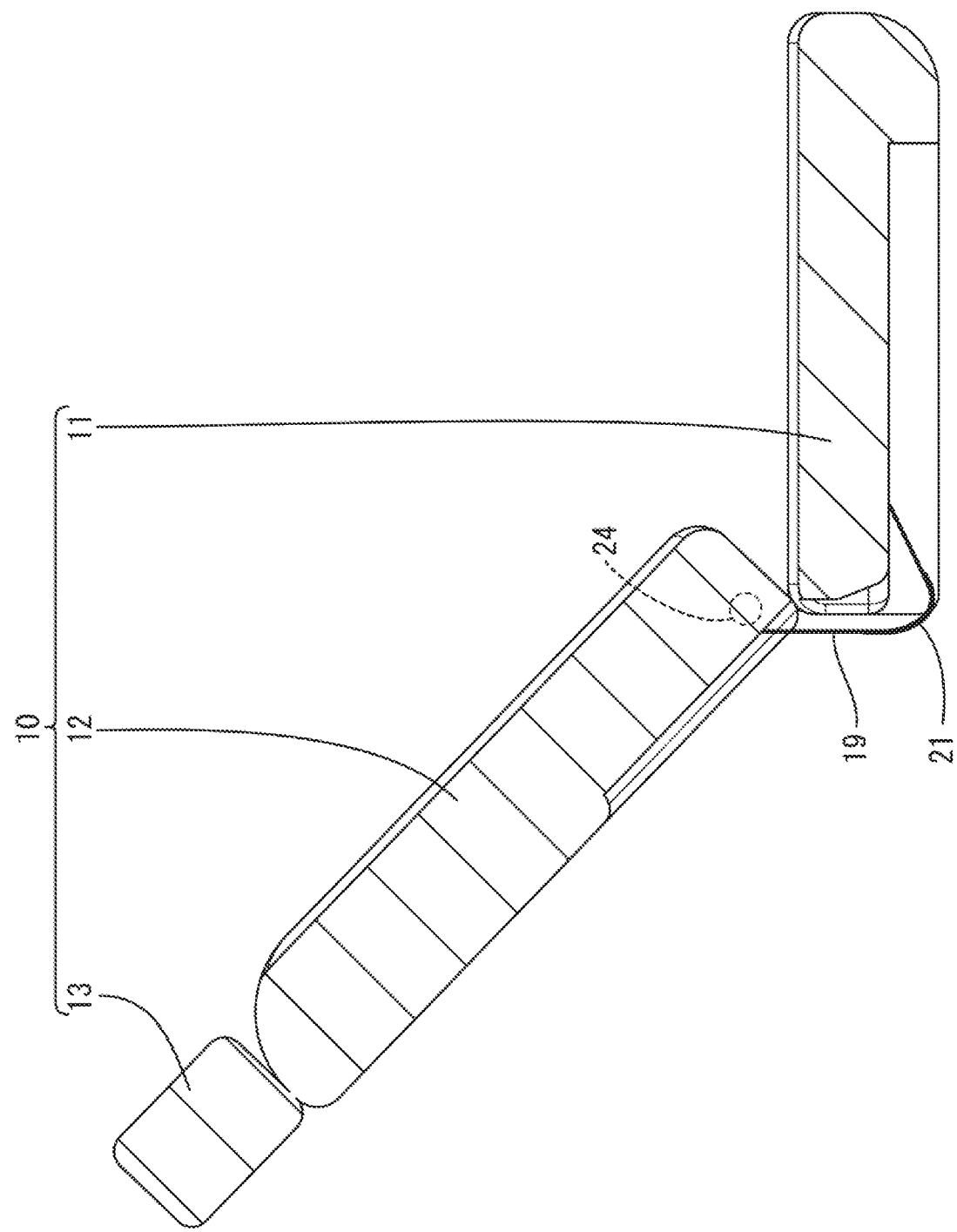
FIG. 9 is a cross-sectional view illustrating a state in which a backrest portion of the seat is rotated by a reclining mechanism.
Figure 10:
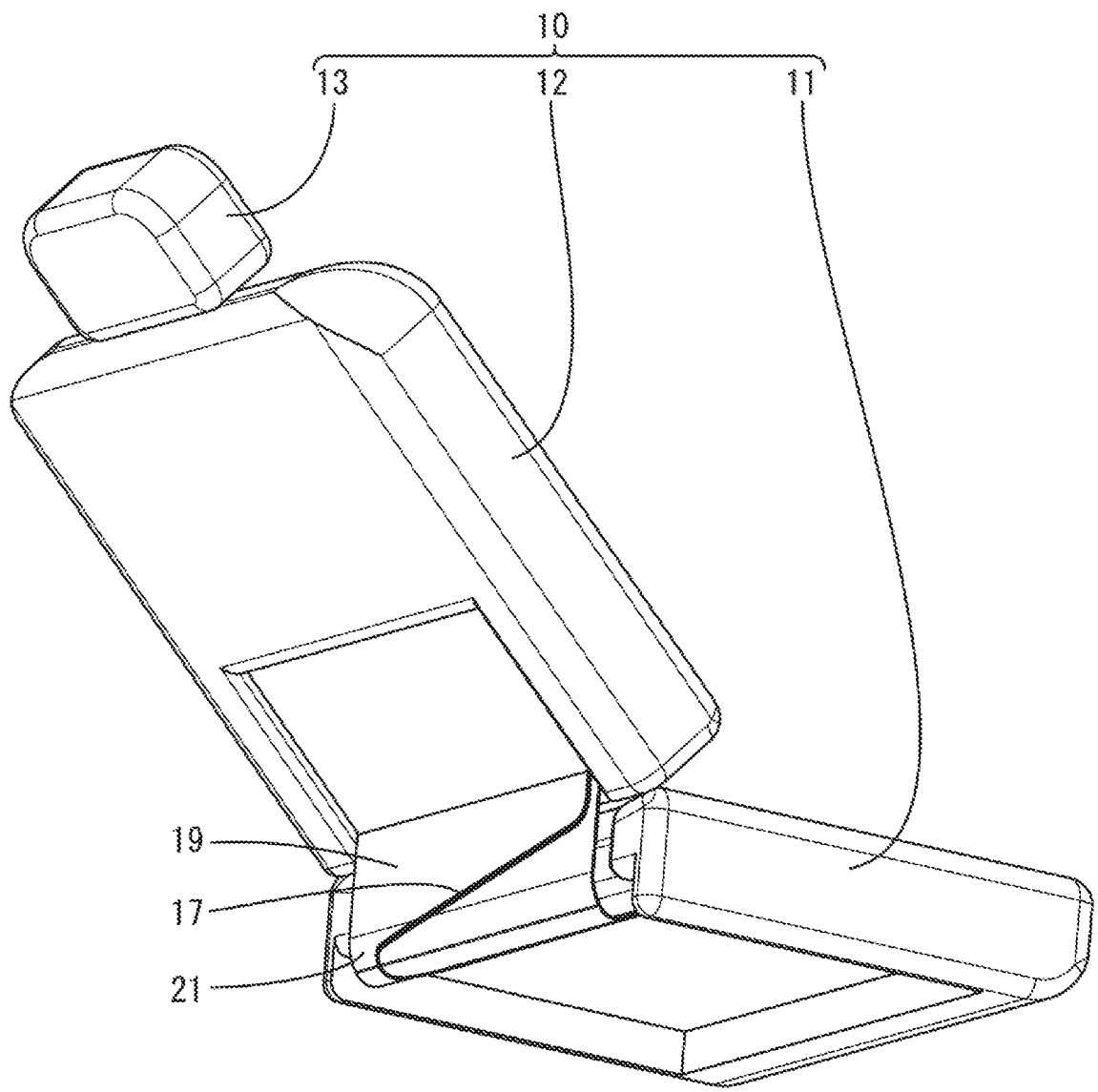
FIG. 10 is a perspective view illustrating a state in which the backrest portion of the seat is rotated by the reclining mechanism.

As illustrated in FIGS. 9 and 10, a portion of the sheet-like member 19, which couples the first cushion portion 15 disposed in the seating portion 11 and the second cushion portion 20 disposed in the backrest portion 12, is defined as an extra length portion 21 that allows the backrest portion 12 to rotate when the backrest portion 12 is rotated by the reclining mechanism. The extra length portion 21 is bent and deformed, whereby an extension of an interval between the first cushion portion 15 and the second cushion portion 20, which follows the rotation of the backrest portion 12, is absorbed by the sheet-like member 19, and a force is suppressed from being applied to the electric wires 17 arranged on the sheet-like member 19.

Although not shown in detail, each of the electric wires 17 has a shape in which an outer circumference of a core wire (not shown) is surrounded by an insulating coating (not shown). The core wire may be a twisted wire in which thin metal wires are twisted together, or may be a single core wire made of bar-like metal.

Figure 12:
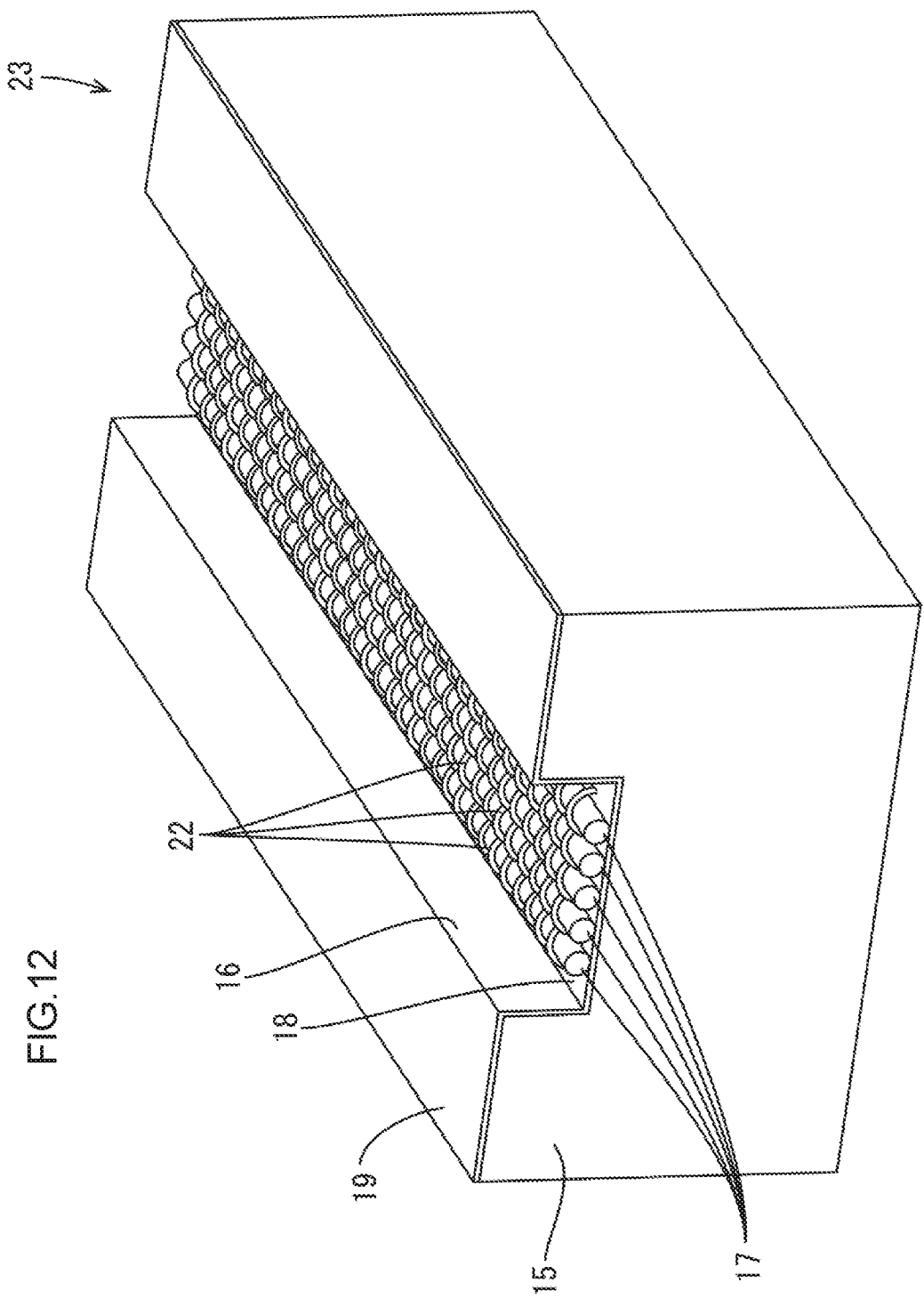
FIG. 12 is a partially enlarged perspective view illustrating the routing structure of the electric wires.
Figure 13:
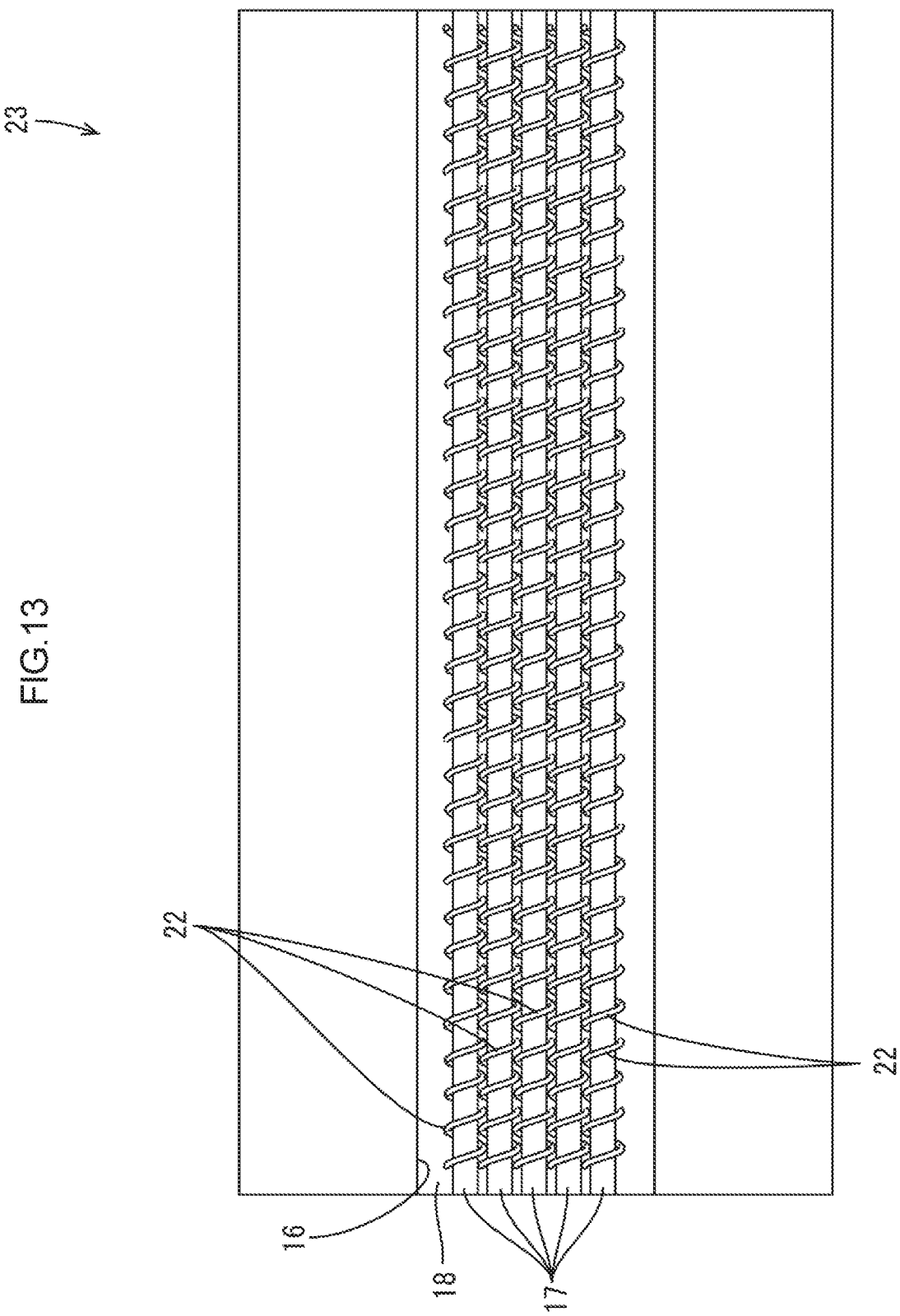
FIG. 13 is a partially enlarged plan view illustrating the routing structure of the electric wires.
Figure 14:
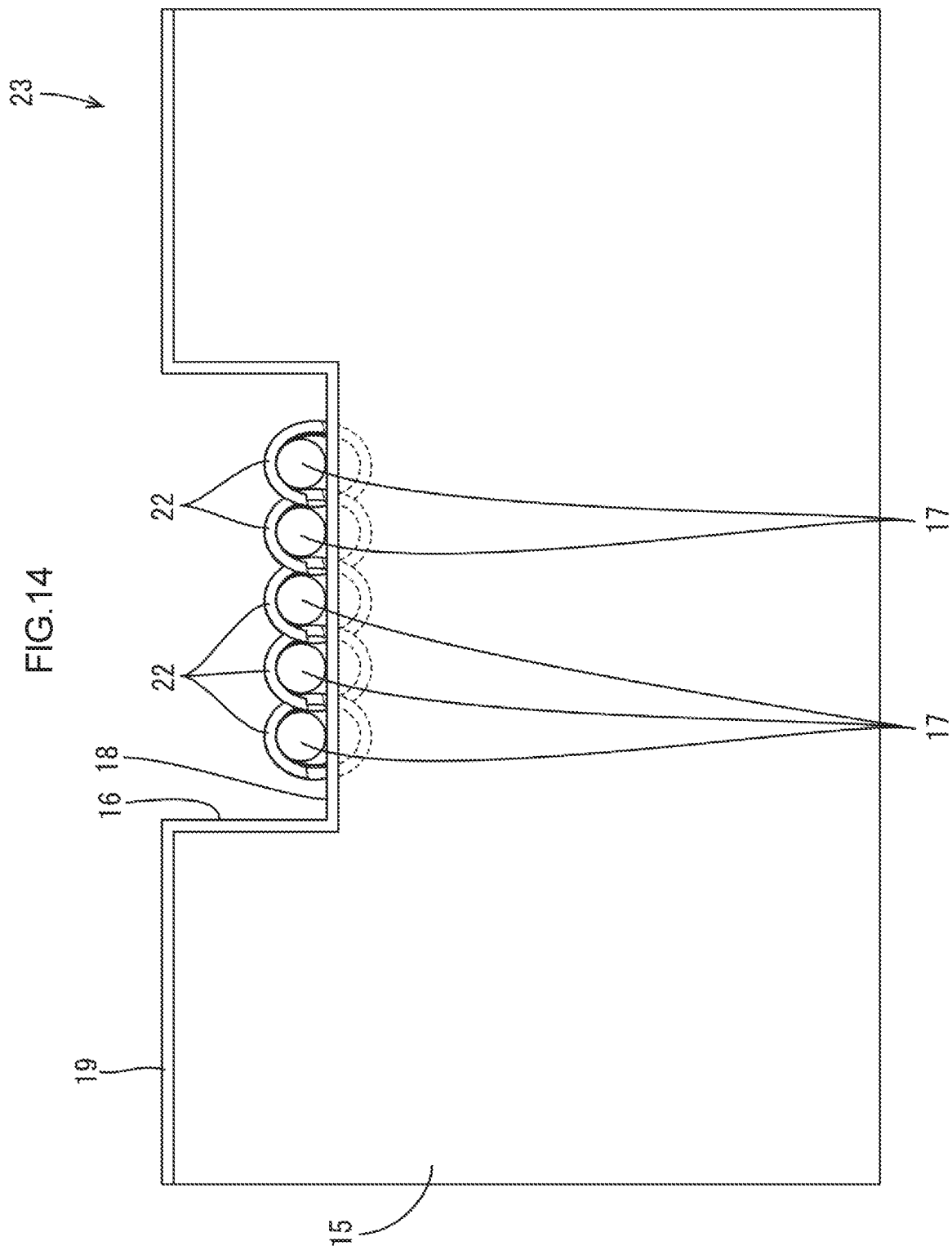
FIG. 14 is a partially enlarged front view illustrating the routing structure of the electric wires.

As illustrated in FIGS. 12 to 14, on the bottom wall 18 of the groove portion 16 of the first cushion portion 15, the plurality of electric wires 17 are arranged along a direction in which the groove portion 16 extends. The plurality of electric wires 17 are sewn to both of the sheet-like member 19 and the first cushion portion 15 by a thread-like member 22. A material constituting the thread-like member 22 may be natural fiber such as cotton, hemp, and silk, or synthetic fiber such as polyester and nylon, or may include both of the natural fiber and the synthetic fiber. The material constituting the thread-like member 22 preferably has an insulating property. In FIGS. 2 to 7, the thread-like member 22 is omitted for convenience of explanation.

As illustrated in FIGS. 13 and 14, the thread-like member 22 is configured to wind around the outer circumference of one electric wire 17 outside the first cushion portion 15, to penetrate the sheet-like member 19 to enter an inside of the first cushion portion 15, and to pass through the inside of the first cushion portion 15, penetrate the sheet-like member 19 again, and wind around the outer circumference of the electric wire 17 outside the first cushion portion 15. This configuration is repeated in a direction in which the electric wire 17 extends. Thus, the electric wires 17 are fixed to the bottom wall 18 of the groove portion 16.

As described above, in the groove portion 16 of the first cushion portion 15, the electric wire 17 is sewn by the thread-like member 22 to both of the sheet-like member 19 pasted into the groove portion 16 and the first cushion portion 15. Further, although not shown in detail, a groove portion (not shown) is also formed in the second cushion portion 20, and in this groove portion, the electric wire 17 is sewn together with the sheet-like member 19 by the thread-like member 22. Moreover, the electric wire 17 is also sewn by the thread-like member 22 in the extra length portion 21 located between the first cushion portion 15 and the second cushion portion 20.

Although not shown in detail, also in the extra length portion 21, such a form as follows is repeated along the direction in which the electric wire 17 extends. In the form, the thread-like member 22 winds around the outer circumference of the electric wire 17 disposed on one surface side of the sheet-like member 19, and the thread-like member 22 penetrates the sheet-like member 19 to be passed through the other surface side of the sheet-like member 19, and again, penetrates the sheet-like member 19 to wide around the outer circumference of the electric wire 17 on one surface side of the sheet-like member 19.

Next, an example of a step for sewing the electric wire 17 to the first cushion portion 15 will be described. The sheet-like member 19 is pasted to the surface of the first cushion portion 15 by a known method such as adhesion and heat fusion.

As illustrated in FIG. 11, the plurality of electric wires 17 is arranged side by side on a bottom portion of the groove portion 16. Next, the electric wires 17 are sewn to the first cushion portion 15 together with the sheet-like member 19 by the thread-like member 22. This sewing operation may be hand-sewn or a sewing machine (not shown) may be used. By the above operation, the electric wires 17 are fixed to the first cushion portion 15 (see FIG. 12).

Then, functions and effects of the present embodiment will be described. The routing structure 23 of the electric wires 17 according to the present embodiment includes: the foam-made first cushion portion 15 attached to the vehicle seat 10; and the electric wires 17 fixed to the first cushion portion 15.

According to the above configuration, the first cushion portion 15 to which the electric wires 17 are fixed is attached to the vehicle seat 10, whereby the electric wires 17 can be routed to the vehicle seat 10, and accordingly, the number of man-hours for attaching the electric wires 17 to the vehicle seat 10 can be reduced.

Further, since the electric wires 17 are fixed to the first cushion portion 15, a space in the seat 10, in which the first cushion portion 15 is disposed, can be used effectively. Thus, a space for routing the electric wires 17 can be ensured.

Further, according to the present embodiment, the electric wires 17 are sewn to the first cushion portion 15 by the thread-like member 22. Thus, in comparison with a case of fixing the electric wires 17 to the first cushion portion 15 using a relatively strong member such as a metal member, the electric wires 17 can be routed without impairing flexibility of the first cushion portion 15.

Further, according to the present embodiment, the electric wires 17 are sewn to the sheet-like member 19 by the thread-like member 22, and the sheet-like member 19 is fixed to the first cushion portion 15. According to the above configuration, since the electric wires 17 are sewn to the sheet-like member 19, efficiency of the sewing operation of the electric wires 17 can be improved.

Further, according to the present embodiment, the first cushion portion 15 has the groove portion 16, and the electric wire 17 is fixed to the first cushion portion 15 in a state of being arranged in the groove portion 16. According to the above configuration, since the electric wires 17 are arranged in the groove portion 16 formed in the first cushion portion 15, the electric wires 17 are suppressed from protruding to the outside of the first cushion portion 15. Thus, a routing space of the electric wires 17 can be suppressed from enlarging.

Further, according to the present embodiment, the first cushion portion 15 and the second cushion portion 20 are coupled to each other by the flexible sheet-like member 19, and the electric wires 17 are sewn to the sheet-like member 19 by the thread-like member 22.

According to the above configuration, even when the backrest portion 12 rotates about the rotation shaft 24 provided in the seating portion 11 (see FIGS. 9 and 10), since the electric wires 17 are sewn to the flexible sheet-like member 19, and the sheet-like member 19 has the extra length portion 21, the extension of the interval between the first cushion portion 15 and the second cushion portion 20, which follows the rotation of the backrest portion 12, is absorbed by the sheet-like member 19, which can follow the rotation of the backrest portion 12. Thus, a malfunction that follows application of a force to the electric wires 17 is suppressed.

Further, according to the present embodiment, the seat 10 includes the frame 14 that supports the first cushion portion 15, and the groove portion 16 is formed on a surface of the first cushion portion 15, which contacts the frame 14, so as to be recessed in the direction of separating away from the first cushion portion 15.

According to the above configuration, even if the passenger is seated on the seat 10, the weight of the passenger is applied to the first cushion portion 15, and the weight is received by the frame 14, the electric wires 17 are fixed to the bottom portion of the groove portion 16 formed to be recessed in the direction of separating away from the frame 14, and accordingly, the electric wires 17 are suppressed from receiving the force directly from the first cushion portion 15. Thus, the malfunction that follows the application of the force to the electric wires 17 is suppressed.

Embodiment 2

Figure 15:
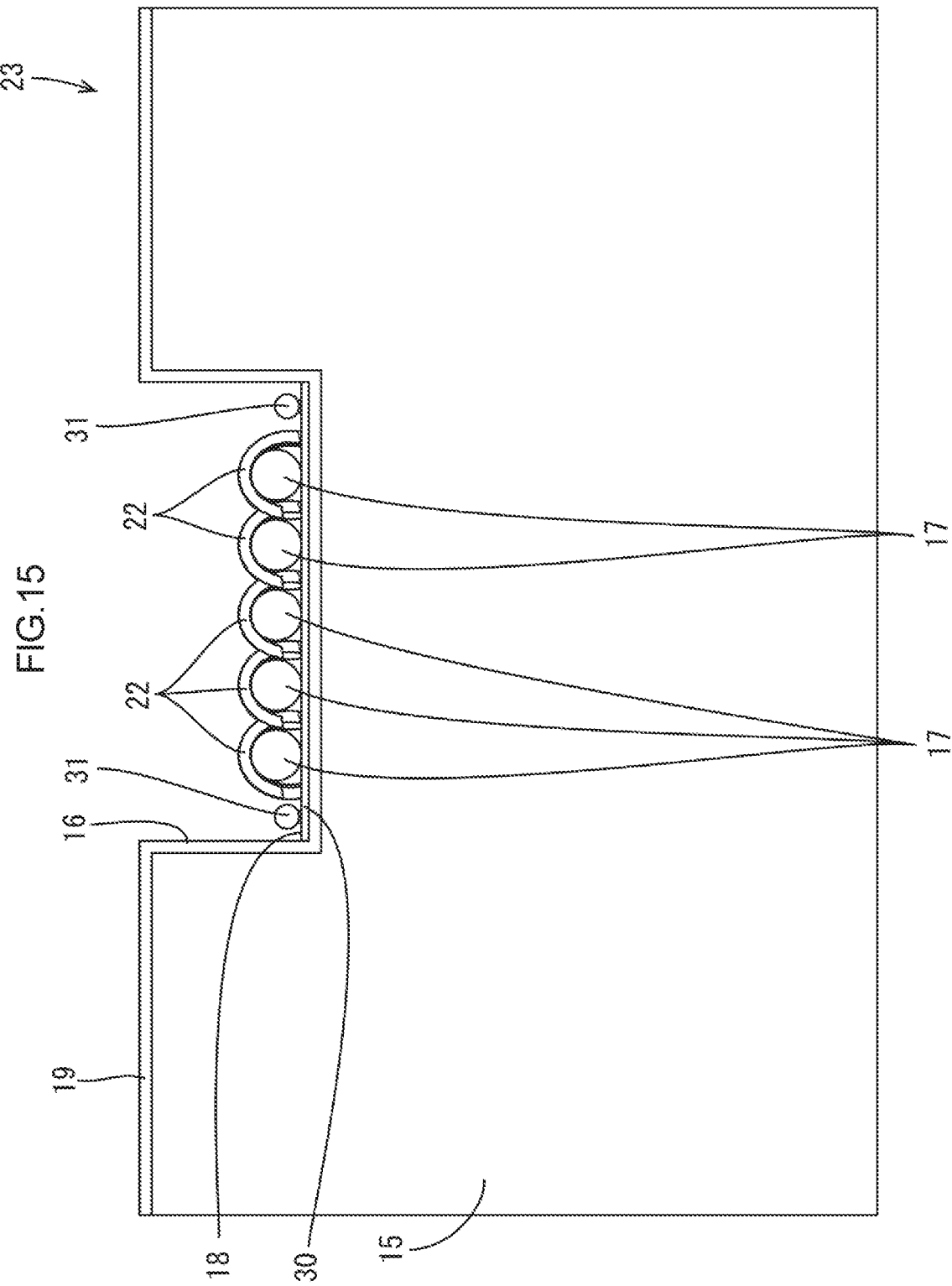
FIG. 15 is a partially enlarged front view illustrating a routing structure of electric wires according to a second embodiment.
Figure 16:
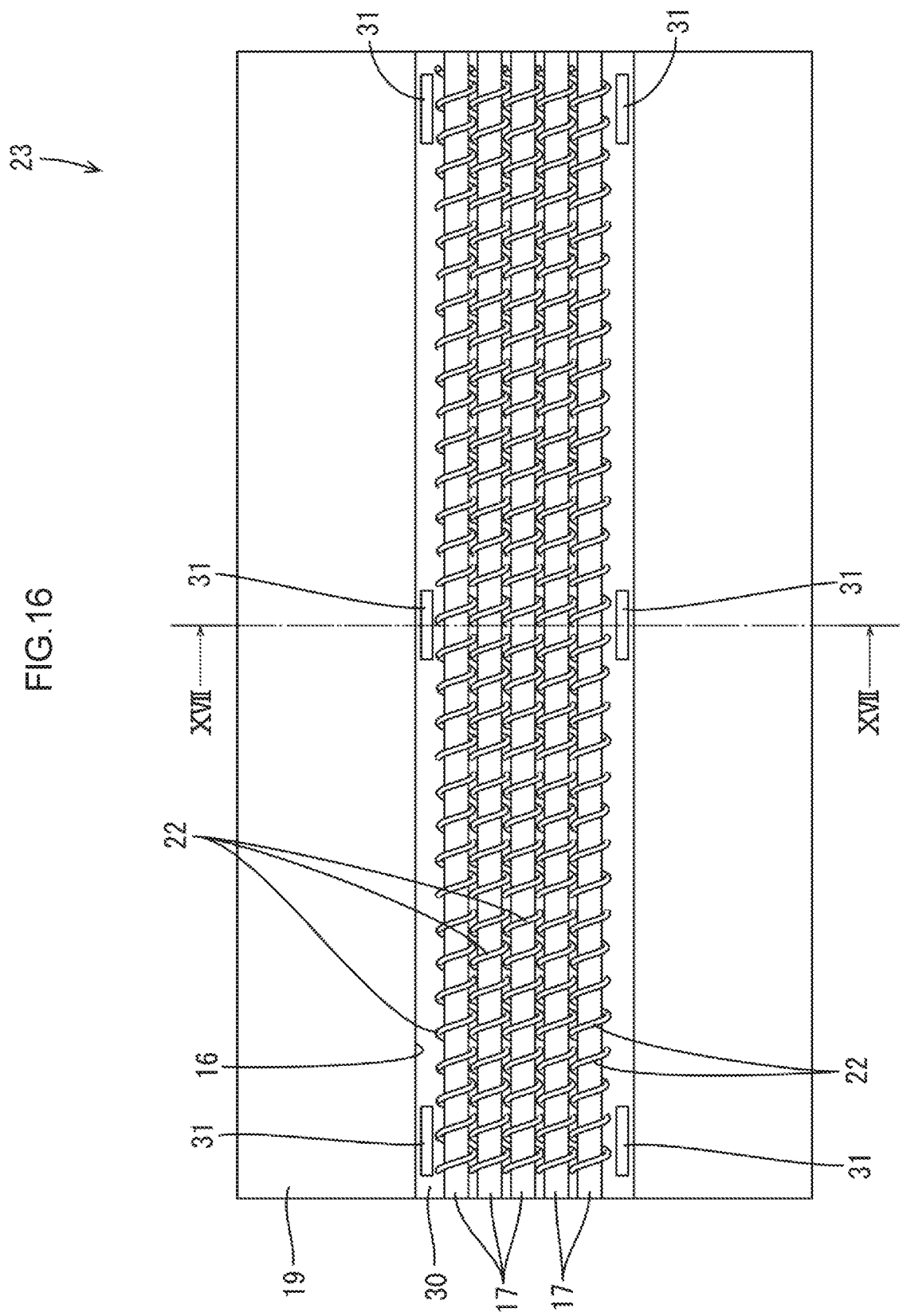
FIG. 16 is a partially enlarged plan view illustrating the routing structure of the electric wires.

Next, Embodiment 2 of the technology disclosed in the present specification will be described with reference to FIGS. 15 to 19. As illustrated in FIG. 15, in the present embodiment, electric wires 17 are sewn by a thread-like member 22 to a sheet-like member 30 different from the sheet-like member 19 pasted to the surface of the first cushion portion 15. This sheet-like member 30 is fixed to the first cushion portion 15 by so-called tag pins 31. As the tag pins 31, for example, tag pins having a similar shape to those to be used when attaching tags to products such as cloths can be used.

Figure 17:
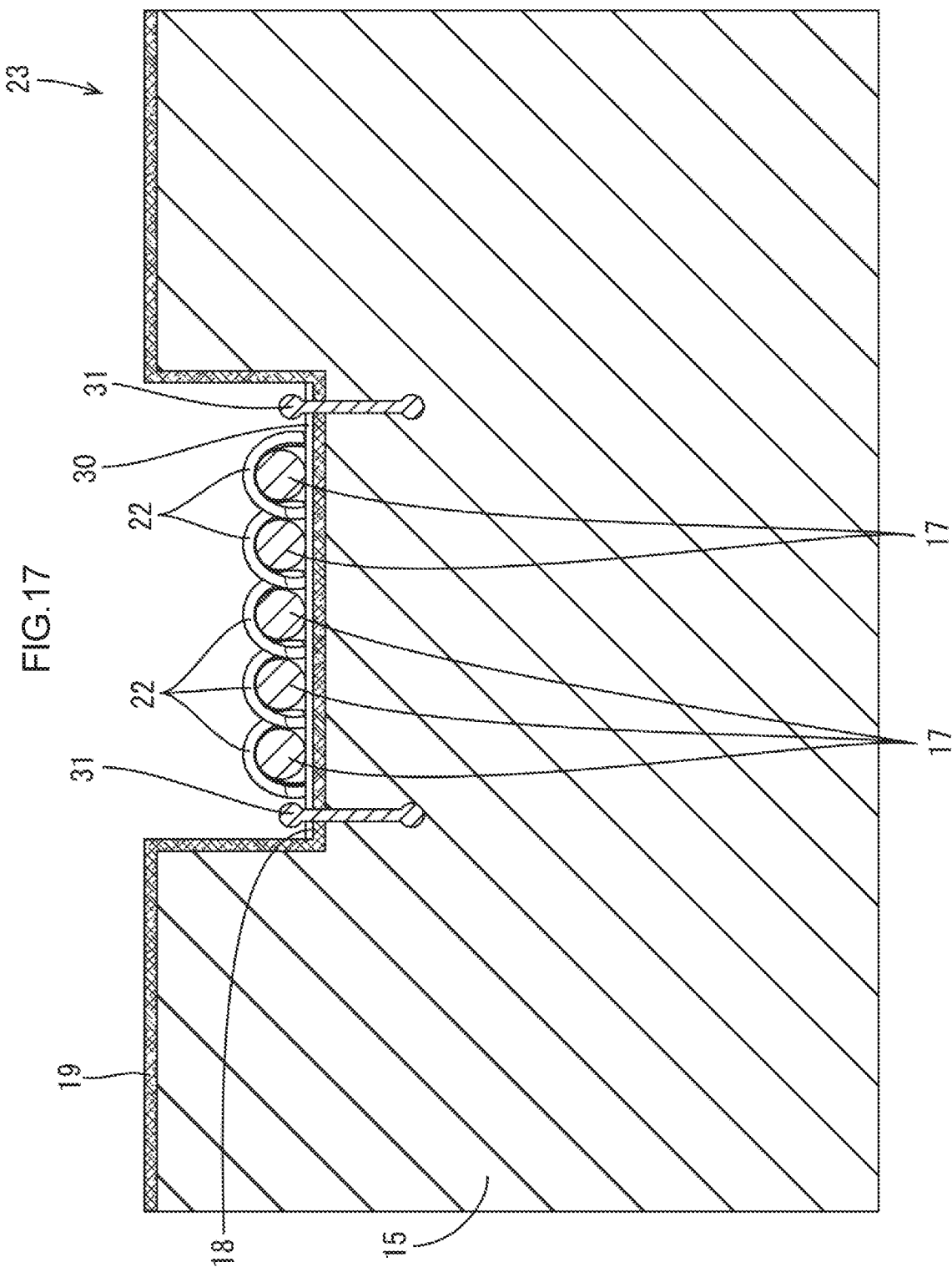
FIG. 17 is a cross-sectional view taken along a line XVII-XVII in FIG. 16.
Figure 18:
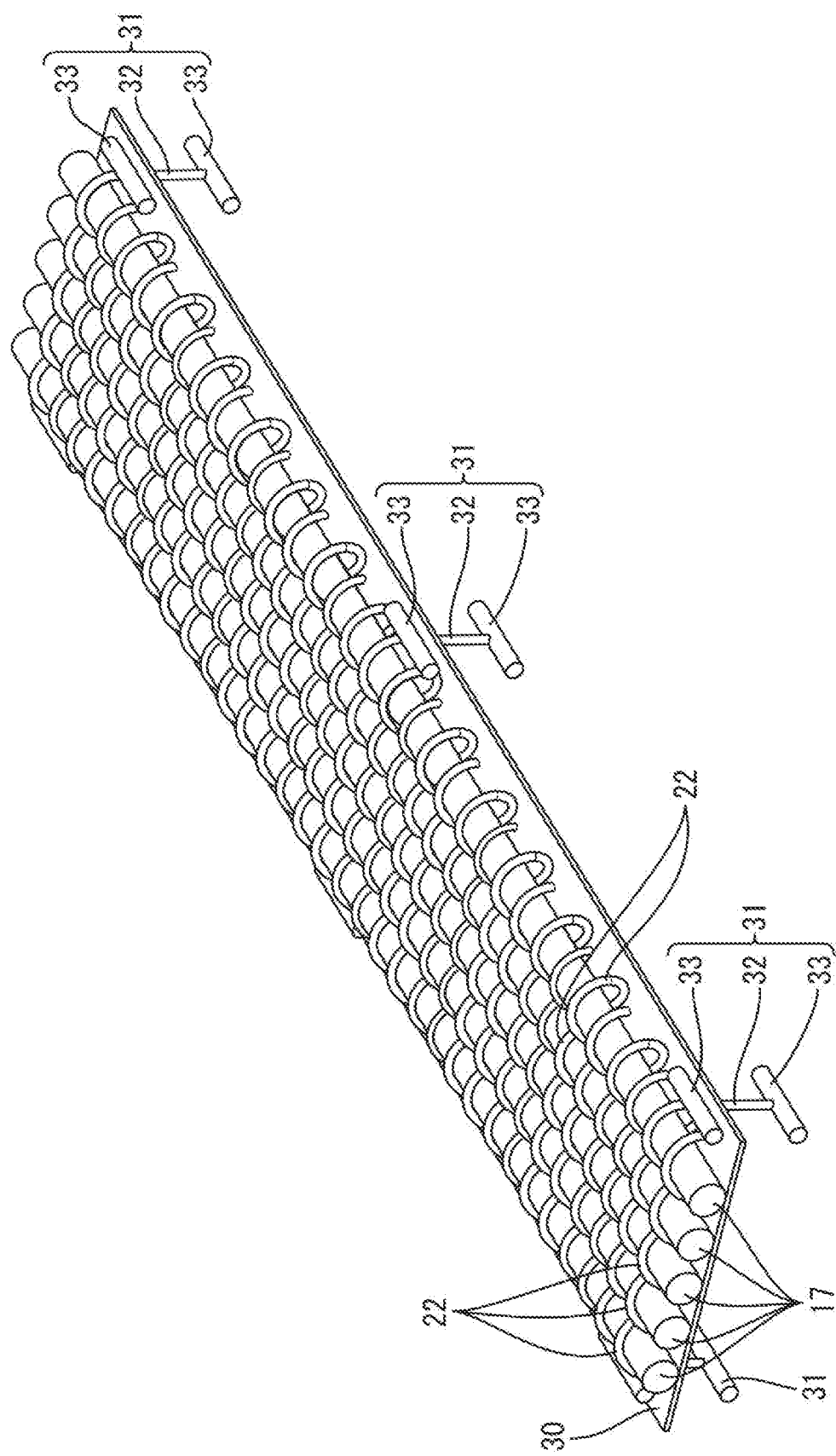
FIG. 18 is a perspective view schematically illustrating a state in which tag pins are attached to a sheet-like member on which the electric wires are sewn.
Figure 19:
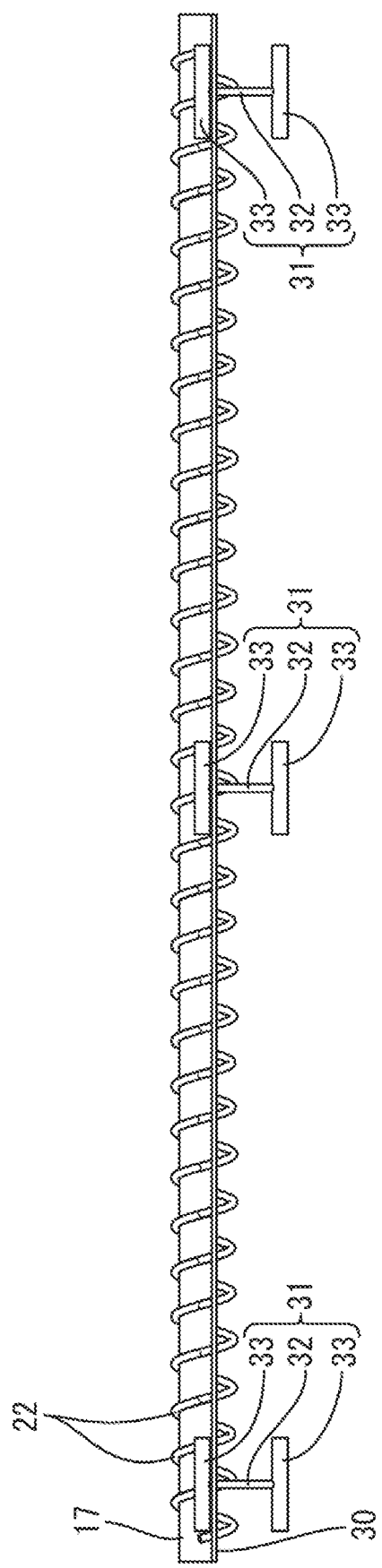
FIG. 19 is a side view schematically illustrating a state in which the tag pins are attached to the sheet-like member on which the electric wires are sewn.

As illustrated in FIG. 18, the tag pins 31 are provided with retaining portions 33 extending perpendicularly to shaft portions 32 at both end portions of the shaft portions 32. As illustrated in FIG. 17, one end portion of each of the tag pins 31 is embedded in the first cushion portion 15, and the other end portion penetrates the sheet-like member 19 and the sheet-like member 30. Thus, the sheet-like member 30 is restricted from being detached from the first cushion portion 15 by the retaining portions 33 formed on such other end portions of the tag pins 31.

Since configurations other than the above are substantially similar to those of Embodiment 1, the same members are denoted by the same reference numerals, and a repeated description is omitted.

Next, an example of an assembly step of the electric wires 17 to the first cushion portion 15 according to the present embodiment will be described. A plurality of the electric wires 17 are arranged on the sheet-like member 30. Next, the electric wires 17 are sewn to the sheet-like member 30 by the thread-like member 22. This sewing operation may be performed manually, or a sewing machine (not shown) may be used.

Subsequently, the sheet-like member 30 to which the electric wires 17 are sewn is placed on a bottom portion of the groove portion 16 formed on the first cushion portion 15. In the present embodiment, the sheet-like member 30 is disposed while causing a surface, which is opposite to a surface having the electric wires 17 fixed thereto, to face the first cushion portion 15. The sheet-like member 30 may have a configuration in which such a surface to which the electric wires 17 are fixed is disposed to face the first cushion portion 15.

The sheet-like member 30 placed on the bottom portion of the groove portion 16 is fixed to the first cushion portion 15 by the tag pins 31 using a known tag gun (not shown).

According to the present embodiment, the electric wires 17 are sewn to the sheet-like member 30 by the thread-like member 22, and the sheet-like member 30 is fixed to the first cushion portion 15.

According to the above configuration, since the electric wires 17 are sewn to the sheet-like member 30, the efficiency of the sewing operation of the electric wires 17 can be improved.

Further, according to the present embodiment, the sheet-like member 30 is fixed to the first cushion portion 15 by the tag pins 31.

According to the above configuration, efficiency of such an operation of fixing the sheet-like member 30 to the bottom portion of the groove portion 16 formed in the first cushion portion 15 can be improved.

Embodiment 3

Next, Embodiment 3 of the technology disclosed in the present specification will be described with reference to FIGS. 20 and 21. In the present embodiment, a plurality of groove portions 41 is provided in a first cushion portion 40. A cross-sectional shape of the groove portions 41 is substantially V-shaped, and the groove portions 41 are so-called V-shaped grooves. One electric wire 17 is disposed in one groove portion 41.

Figure 20:
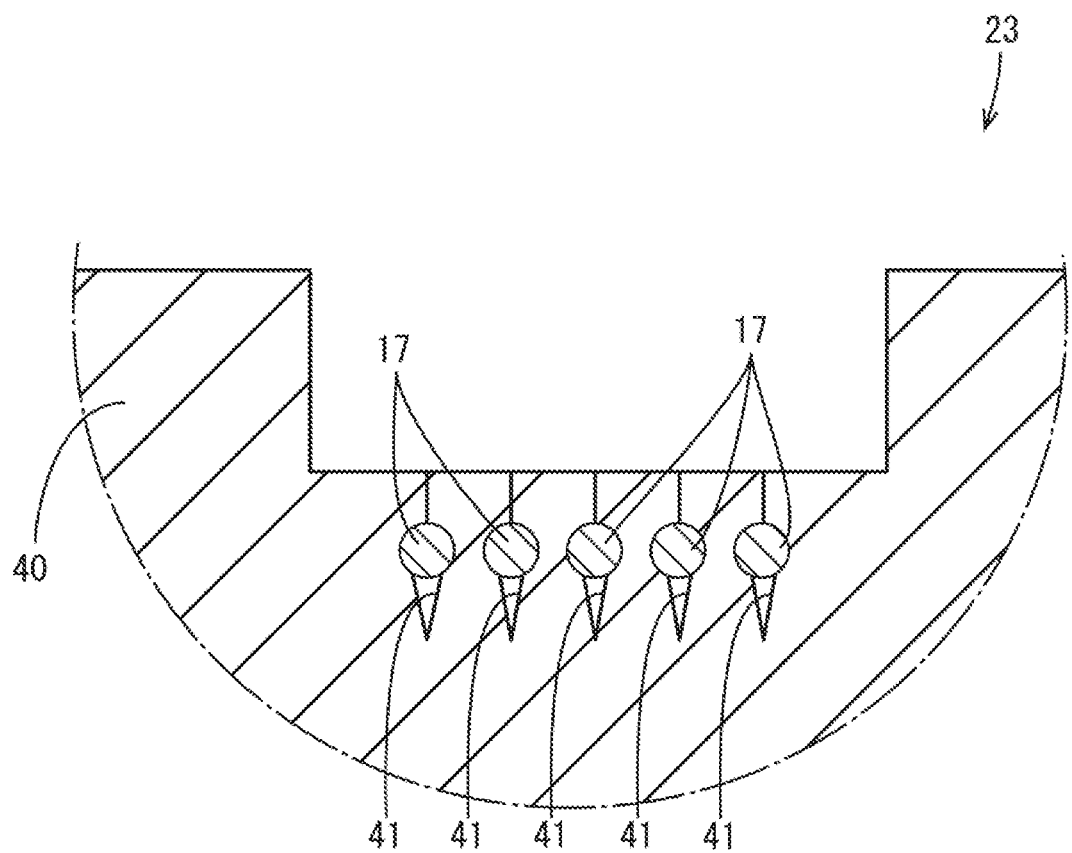
FIG. 20 is a partially enlarged cross-sectional view illustrating a routing structure of electric wires according to a third embodiment.

As illustrated in FIG. 20, the groove portions 41 are joined to one another in a state in which opening portions 42 are closed. Thus, the electric wires 17 are configured not to be exposed to the outside of the first cushion portion 40. As a technique for joining the opening portions 42 of the groove portions 41 to one another, any technique such as adhesion by an adhesive, welding by heating, and sewing by a thread-like member can be adopted as necessary. In the present embodiment, the opening portions 42 of the groove portions 41 are bonded with an adhesive.

Since configurations other than the above are substantially similar to those of Embodiment 1, the same members are denoted by the same reference numerals, and a repeated description is omitted.

Next, an example of an assembly step of the electric wires 17 to the first cushion portion 40 according to the present embodiment will be described. The plurality of groove portions 41 are formed in the first cushion portion 40. The groove portions 41 may be formed by cutting, or may be formed by melting a part of the first cushion portion 40 by heating.

Figure 21:
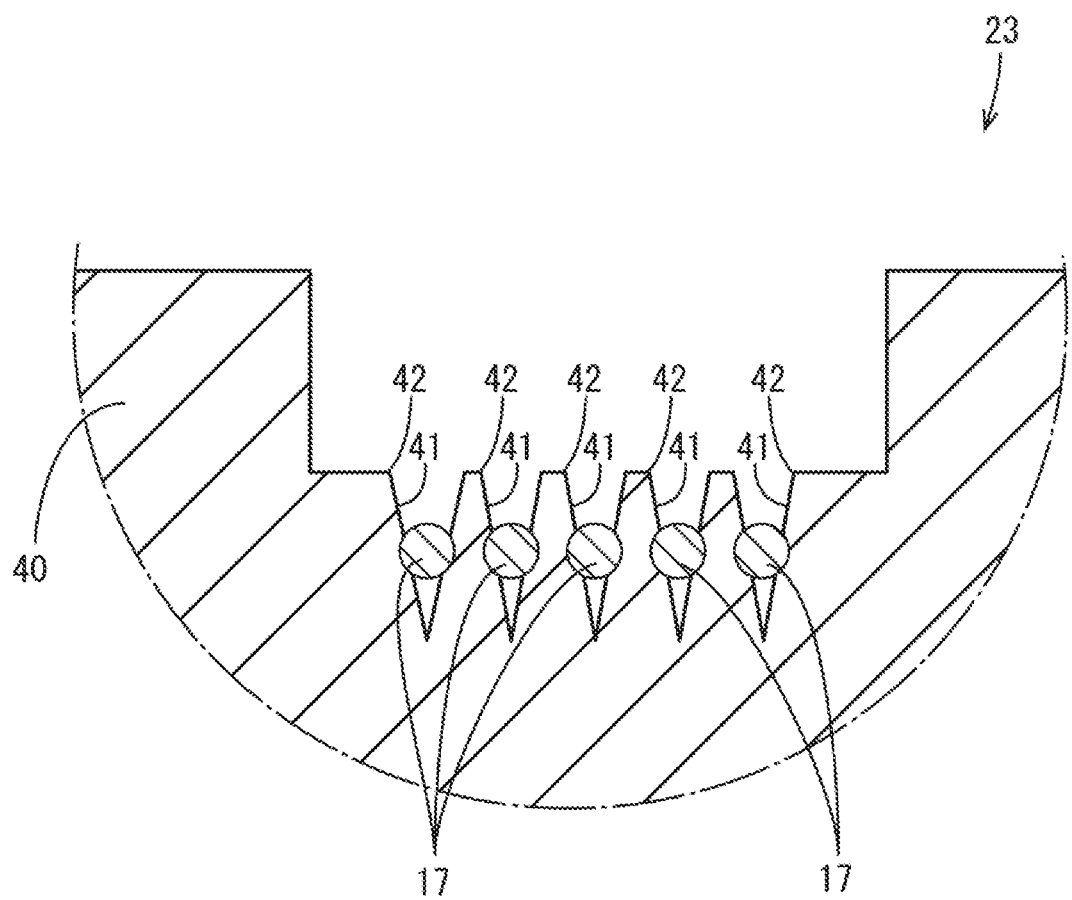
FIG. 21 is a partially enlarged cross-sectional view illustrating an assembly step of the electric wires to a first cushion portion.

As illustrated in FIG. 21, one electric wire 17 is inserted into one groove portion 41. The cross-sectional shape of the groove portions 41 is V-shaped. Accordingly, if the electric wires 17 are pushed into portions in each of which a dimension between inner walls of the groove portions 41 is the same as an outer diameter dimension of the electric wire 17 or is slightly narrower than the same, then each of the electric wires 17 is sandwiched between the inner walls of the groove portion 41 by an elastic force of the first cushion portion 40 made of a foaming material.

Subsequently, as illustrated in FIG. 20, the opening portions 42 of the groove portions 41 are closed. In this state, the opening portions 42 of the groove portions 41 are bonded with an adhesive. Thus, the electric wires 17 are fixed into the groove portions 41.

According to the present embodiment, the first cushion portion 40 has the groove portions 41, the electric wires 17 are arranged in the groove portions 41, and the opening portions 42 of the groove portions 41 are joined in a closed state.

According to the above configuration, the electric wires 17 can be fixed to the cushion portions by such a simple method of arranging the electric wires 17 in the groove portions 41 and closing the opening portions 42 to join the groove portions 41.

Other Embodiments

The technology disclosed in the present specification is not limited to the embodiments described with reference to the above description and drawings, and for example, such embodiments as follows are also incorporated in the technical scope of the technology disclosed in the present specification.

(1) In Embodiments 1 and 2, the sheet-like member is fixed to the cushion portion such that the electric wires are located opposite to the cushion portion. However, the sheet-like member is not limited to this, and the sheet-like member may be fixed to the cushion portion in an attitude in which the electric wires face the cushion portion.

(2) The electric wire may be sewn directly on the surface of the cushion portion with the thread-like member, may be joined thereby by thermal welding, or may be bonded thereto.

(3) The electric wires 17 and the second cushion portion 20 can be fixed to each other by a similar technique to that for the electric wires 17 and the first cushion portion 15.

(4) In Embodiments 1 to 3, the electric wires 17 are configured to be fixed to the lower surface of the first cushion portion 15. However, the electric wires 17 are not limited to this, and the electric wires 17 may be configured to be fixed to an upper surface or side surface of the first cushion portion 15. Moreover, the electric wires 17 may be configured to be fixed to an upper surface, lower surface or side surface of the second cushion portion 20.

(5) The groove portions 41 according to Embodiment 3 are configured to have a V-shaped cross-sectional shape. However, the groove portions 41 are not limited to this, and the cross-sectional shape of the groove portions 41 can be formed into any shape such as a U-shape and a C-shape.

EXPLANATION OF SYMBOLS

10: Seat
11: Seating portion
12: Backrest portion
14: Frame
15: First cushion portion
16, 41: Groove portion
17: Electric wire
19, 30: Sheet-like member
20: Second cushion portion
21: Extra length portion
22: Thread-like member
23: Routing structure of electric wire(s)
24: Rotation shaft
31: Tag pin
42: Opening portion

The invention claimed is:

1. A routing structure of an electric wire, comprising:
a cushion portion attached to a vehicle seat; and
an electric wire fixed to the cushion portion, wherein
the seat includes a seat portion and a backrest portion, the backrest portion being pivotable relative to the seat portion,
the cushion portion includes:
a first cushion portion disposed on the seat portion, and
a second cushion portion disposed on the backrest portion,
the first cushion portion and the second cushion portion are coupled to each other by a flexible sheet, and
the electric wire is fixed to a first portion of the flexible sheet that is disposed on the first cushion portion, a second portion of the flexible sheet that is disposed on the second cushion portion, and a third portion of the flexible sheet that is disposed between the first portion of the flexible sheet and the second portion of the flexible sheet.

2. The routing structure of an electric wire according to claim 1, wherein the electric wire is sewn to the cushion portion by a thread.

3. The routing structure of an electric wire according to claim 2, wherein
the cushion portion has a groove portion, and the electric wire is disposed in the groove portion, and
the groove portion is joined in a condition in which an opening portion of the groove portion is closed.

4. The routing structure of an electric wire according to claim 1, wherein
the electric wire is sewn to the flexible sheet by a thread, and
the flexible sheet is fixed to the cushion portion.

5. The routing structure of an electric wire according to claim 4, wherein the flexible sheet is fixed to the cushion portion by a tag pin.

6. The routing structure of an electric wire according to claim 1, wherein the cushion portion has a groove portion, and the electric wire is fixed to the cushion portion in a condition of being disposed in the groove portion.

7. The routing structure of an electric wire according to claim 6, wherein
the seat has a frame that supports the cushion portion, and
the groove portion is formed on a surface of the cushion portion, the surface contacting the frame so as to be recessed in a direction of separating away from the cushion portion.

8. The routing structure of an electric wire according to claim 1, wherein
the backrest portion is provided rotatably about a rotation shaft provided in the seat portion,
the electric wire is sewn to the flexible sheet by a thread, and
the flexible sheet includes an extra length portion in the third portion of the flexible sheet that allows the backrest portion to rotate.

* * * * *